US012230304B2

(12) United States Patent
Lamberts et al.

(10) Patent No.: US 12,230,304 B2
(45) Date of Patent: Feb. 18, 2025

(54) DATA STORAGE DEVICE WITH WRITE PROTECTION AND GUARANTEED RAPID WRITE VERIFICATION IN ENERGY-ASSISTED RECORDING (EAR)

(71) Applicant: WESTERN DIGITAL TECHNOLOGIES, INC., San Jose, CA (US)

(72) Inventors: Bernd Lamberts, San Jose, CA (US); Bernhard E. Knigge, San Jose, CA (US); Erhard Schreck, San Jose, CA (US); Qing Dai, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/232,003

(22) Filed: Aug. 9, 2023

(65) Prior Publication Data

US 2024/0304214 A1 Sep. 12, 2024

Related U.S. Application Data

(60) Provisional application No. 63/450,510, filed on Mar. 7, 2023.

(51) Int. Cl.
*G11B 27/36* (2006.01)
*G11B 5/48* (2006.01)
(Continued)

(52) U.S. Cl.
CPC ............ *G11B 5/607* (2013.01); *G11B 5/4866* (2013.01)

(58) Field of Classification Search
CPC .......... G11B 11/10506; G11B 11/1051; G11B 2005/0021; G11B 11/10; G11B 11/105;
(Continued)

(56) References Cited

U.S. PATENT DOCUMENTS 6,650,492 B2    11/2003  Lenny et al.
6,956,707 B2 *  10/2005  Ottesen ................. G11B 20/10
                                              360/25
(Continued)

OTHER PUBLICATIONS

D. Suess et al., "Breaking the thermally induced write error in heat assisted recording by using low and high Tc materials." Applied Physics Letters, vol. 102(16), Feb. 2013, 9 pages. https://doi.org/10.1063/1.4802882.

*Primary Examiner* — Nabil Z Hindi
(74) *Attorney, Agent, or Firm* — Calderon Safran & Wright P.C.

(57) ABSTRACT

Various illustrative aspects are directed to a data storage device, comprising one or more disks; an actuator mechanism configured to position one or more heads proximate to a corresponding disk surface of the one or more disks; and one or more processing devices. The one or more processing devices are configured to receive signals indicative of conditions of a write operation by the selected head. The one or more processing devices are further configured to determine, based on the signals, a verification status indicating whether the write operation was successful. The one or more processing devices are further configured to output the verification status within a selected time limit.

20 Claims, 8 Drawing Sheets

(51) Int. Cl.
*G11B 5/54* (2006.01)
*G11B 5/60* (2006.01)

(58) Field of Classification Search
CPC ..... G11B 33/14; G11B 33/1406; G11B 27/36;
G11B 20/18; G11B 5/54; G11B 5/58
USPC .............................................. 360/59, 75, 48
See application file for complete search history.

(56) References Cited

U.S. PATENT DOCUMENTS

| | | |
|---|---|---|
| 8,369,191 B2 * | 2/2013 | Shimazawa .............. G11B 5/40 |
| | | 369/13.13 |
| 8,654,618 B1 | 2/2014 | Liu et al. |
| 9,218,849 B1 | 12/2015 | Trantham et al. |
| 9,318,153 B2 | 4/2016 | Trantham et al. |
| 9,336,831 B2 | 5/2016 | Burnett et al. |
| 9,524,743 B2 | 12/2016 | Zhu et al. |
| 9,984,719 B2 | 5/2018 | Matousek et al. |
| 10,026,420 B1 | 7/2018 | Rausch et al. |
| 10,192,578 B1 | 1/2019 | Macken et al. |
| 10,910,007 B1 | 2/2021 | Trinh et al. |
| 2007/0177302 A1 | 8/2007 | Shimazawa et al. |
| 2010/0188767 A1 * | 7/2010 | Hirose ............... G11B 20/1816 |

\* cited by examiner

DATA STORAGE DEVICE WITH WRITE PROTECTION AND GUARANTEED RAPID WRITE VERIFICATION IN ENERGY-ASSISTED RECORDING (EAR)

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in some examples.

SUMMARY

Various examples disclosed herein provide data storage devices such as hard disk drives with control circuitry that includes novel and inventive real-time monitoring of write mechanism operating conditions in energy-assisted recording (EAR), rapid detection of write mechanism failure within a guaranteed maximum timespan, and assurance of data write integrity in energy-assisted recording, in accordance with aspects of the present disclosure. Various aspects of this disclosure address and resolve novel aspects of write element failure associated with data recording subsystems using energy-assisted recording, such as heat-assisted magnetic recording (HAMR).

In the common approach to the possibility of write element failure in conventional perpendicular recording, the host treats successful status by a write device as a positive indicator that newly written data have been successfully written and are persistent. In conventional energy-assisted recording, it is possible for a write device to continue sending positive status updates to the host for write operations even though the write element has not ensured successful recording of the data. This issue in energy-assisted recording has previously been addressed with passive health monitoring of write device telemetry, such as overwrite, soft error rate (SER), etc., in order to predict a recording element failure in the future. Some systems may also or alternatively track error rates associated with the readback process.

Among the inventive insights of this disclosure, neither of these methods can provide assurance as to how long they may take after a write mechanism failure to detect that failure, other than the write device telemetry monitoring interval. That monitoring interval is typically very long, though, compared with rate of data writing, and reducing the telemetry monitoring interval would increase throughput loss of write operations. Further, telemetry monitoring functions based on an assumption of a gradual change of state of the recording element. Experience with various failure mechanisms in energy-assisted recording shows that this is not a reliable assumption in energy-assisted recording. Failure of the write mechanism may go substantial lengths of time before being detected. This also means that substantial amounts of data that were assumed to have been written nominally may instead have been written with below-nominal write quality, or not written at all. The data assumed to have been written during the undetected write mechanism failure may be recoverable only by using a slow and onerous data recovery process (DRP) or may be completely lost. Additionally, failure mechanisms typically begin in an intermittent form. Since neither of the periodic monitoring mechanisms track the write locations, the locations of potential poor writes may be unknown, and hence may require a complete rebuild of the device.

Various aspects of this disclosure include mechanisms that provide a guaranteed upper bound for the worst-case delay between device failure and its detection. Various aspects of this disclosure further include write data buffering to cover the data, to store the data elsewhere in any failure event up to the guaranteed worst-case delay before device failure detection, and to ensure continuous write throughput in the event of a period during which the functionality of the write element cannot be assured. Various aspects of this disclosure may thus provide novel guarantees of data write integrity and assurance of successful data write operations, within a guaranteed finite time, regardless of any potential write mechanism failures. Various aspects of this disclosure may perform real-time, fine-grained, direct monitoring of write mechanism conditions, e.g., on time scales of microseconds, or other rapid time scales, in various examples. Such guarantees of write device failure detection within a specified maximum time span and successful data recording within a finite time span may be advantageously relied on in overall system architecture, and free the system architecture from needing to include other mechanisms to address potential write failure, in various aspects. This disclosure provides novel advantages, which include an assured, bounded time interval between write element failure and detection; detecting write element failure without dependency on physical modeling of failure mechanisms; minimal latency; flexible tuning and time optimizing of operating parameters with regard to a host's risk policies; and optimized write latency by providing a redundant write data storage buffer in the event of intermittent write element failure, in various examples, among other advantages.

Various illustrative aspects are directed to a data storage device, comprising one or more disks; an actuator mechanism configured to position a selected head among one or more heads proximate to a corresponding disk surface among the one or more disks; and one or more processing devices. The one or more processing devices are configured to receive signals indicative of conditions of a write operation by the selected head. The one or more processing devices are further configured to determine, based on the signals, a verification status indicating whether the write operation was successful. The one or more processing devices are further configured to output the verification status within a selected time limit.

Various illustrative aspects are directed to a method comprising receiving, by one or more processing devices, signals indicative of conditions of a write operation by a selected head to a corresponding disk surface comprised in a data storage device. The method further comprises determining, by the one or more processing devices, based on the signals, a verification status indicating whether the write operation was successful. The method further comprises outputting, by one or more processing devices, the verification status within a selected time limit.

Various illustrative aspects are directed to one or more processing devices comprising means for receiving signals indicative of conditions of a write operation by a selected head to a corresponding disk surface comprised in a data storage device. The one or more processing devices further comprise means for determining, based on the signals, a verification status indicating whether the write operation was successful. The one or more processing devices further comprise means for outputting the verification status within a selected time limit.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

DETAILED DESCRIPTION

Figure 1:
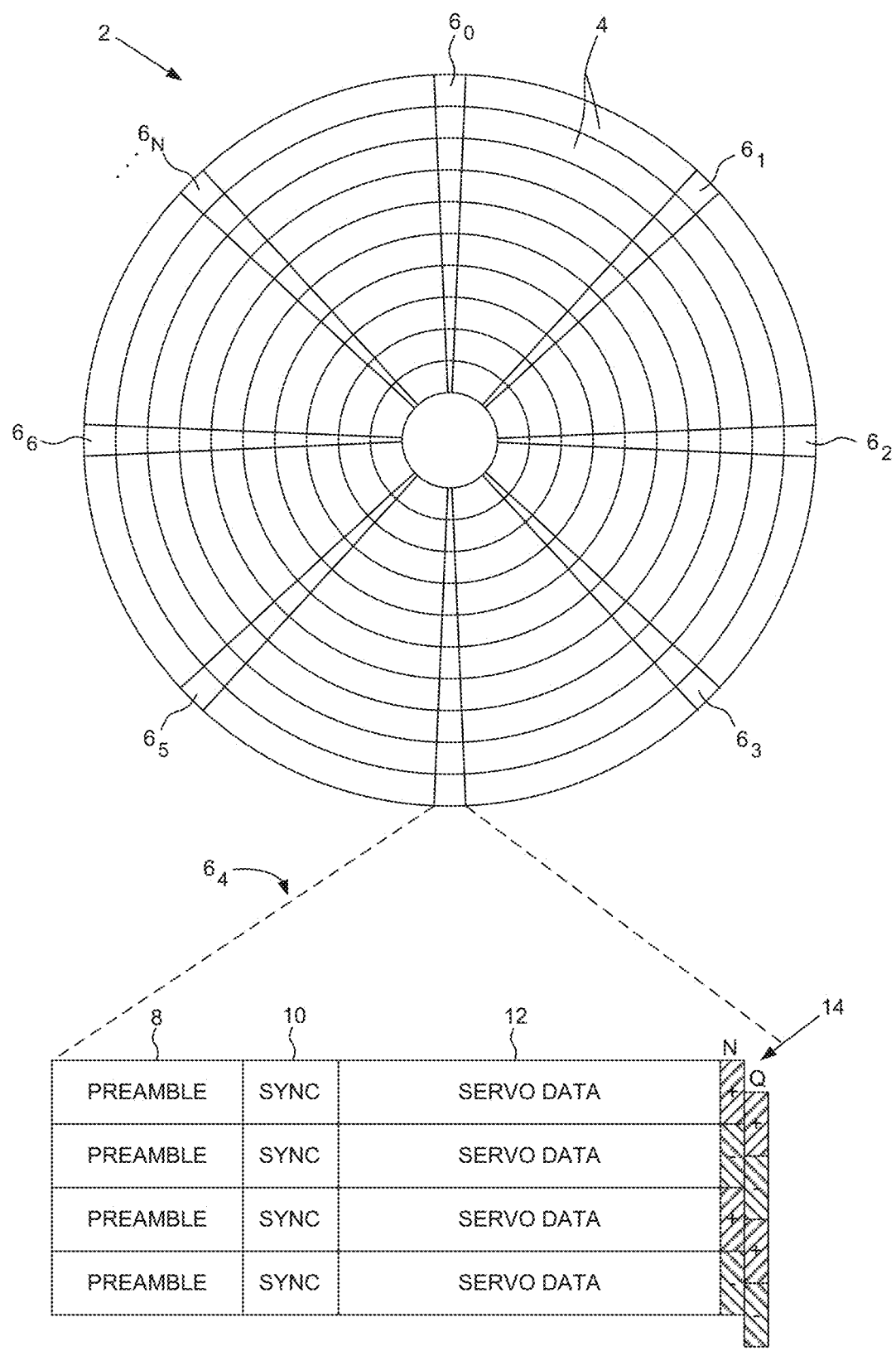
FIG. 1 shows a prior art disk format as comprising a number of radially spaced, concentric servo tracks defined by servo wedges recorded around the circumference of each servo track.
Figure 2:
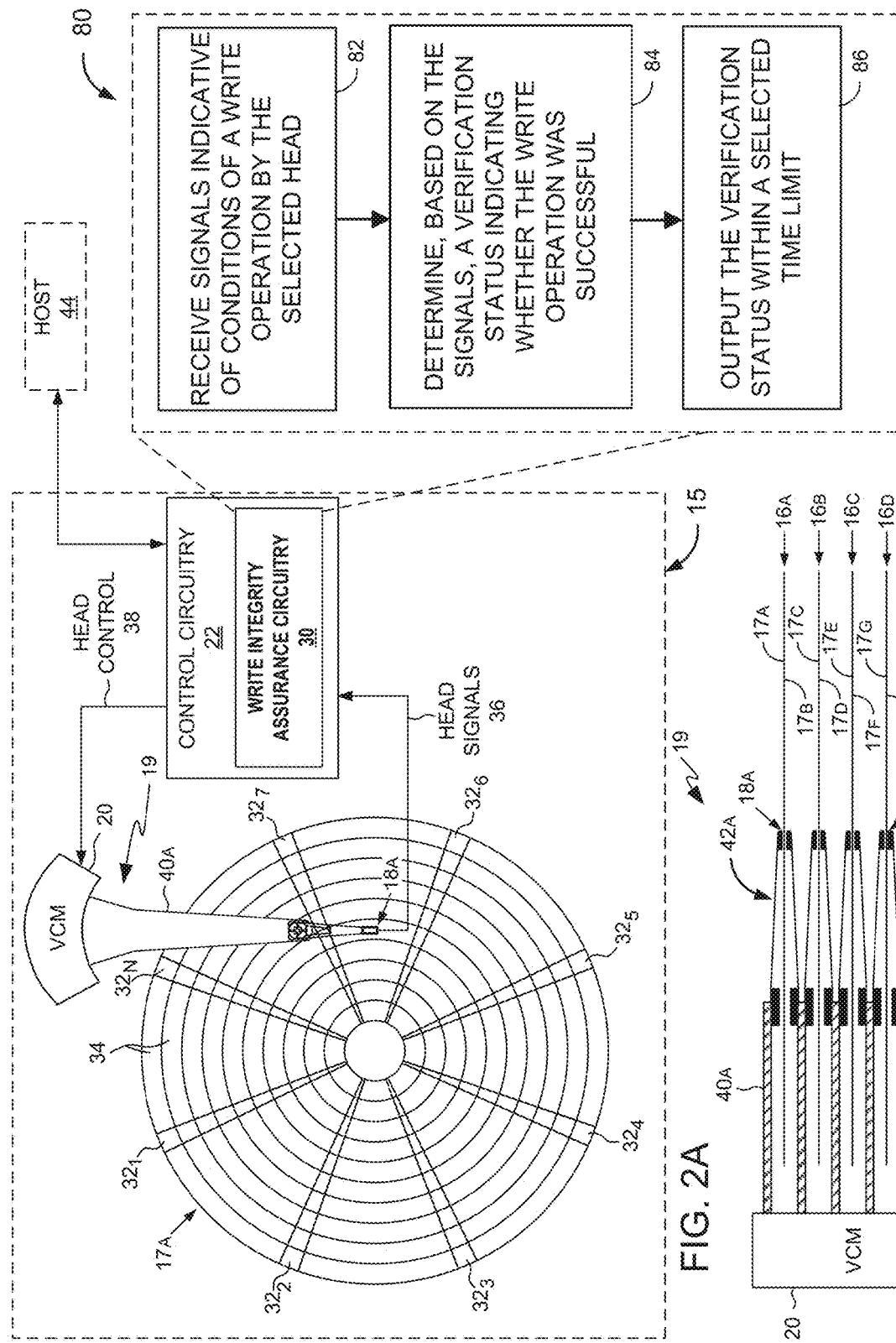
FIGS. 2A and 2B illustrate conceptual block diagrams of a top view and a side view of a data storage device in the form of a disk drive, in accordance with aspects of the present disclosure.
FIG. 2C depicts a flowchart for an example method that write integrity assurance circuitry of control circuitry of a disk drive may perform or execute in controlling the operations of the disk drive, including for outputting verifications of whether write operations are successful within a selected time limit, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). Control circuitry 22 comprises write integrity assurance circuitry 30. FIG. 2C depicts a flowchart for an example method 80 that write integrity assurance circuitry 30 of control circuitry 22 may perform or execute in controlling the operations of disk drive 15, in accordance with aspects of the present disclosure. The operations performed by write integrity assurance circuitry 30 may include operations involved in monitoring of write mechanism operating conditions in energy-assisted recording (EAR), rapidly detecting any possible write mechanism failure within a guaranteed maximum timespan, outputting data write verification status within a guaranteed time limit, and providing assurance of data write integrity in energy-assisted recording, in accordance with aspects of the present disclosure. Write integrity assurance circuitry 30 may thus provide assured detection of any possible write mechanism failure within a maximum time frame, in accordance with aspects of the present disclosure. Write integrity assurance circuitry 30 may further provide assured integrity of data write operations, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples. Each suspension assembly 42 suspends a slider at a distal end thereof, with one of read/write heads 18 ("heads 18") mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges 32$_1$-32N, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges 32$_1$-32N and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, write integrity assurance circuitry 30 of control circuitry 22 may receive signals indicative of conditions of a write operation by the selected head (82). Write integrity assurance circuitry 30 may further determine, based on the signals, a verification status indicating whether the write operation was successful (84). Write integrity assurance circuitry 30 may further output the verification status within a selected time limit (86). Control circuitry 22, including write integrity assurance circuitry 30, may further perform additional actions, methods, and techniques, in accordance with various aspects including as further described herein.

Write integrity assurance circuitry 30 may perform real-time, fine-grained, direct monitoring of write mechanism conditions, e.g., on time scales of microseconds. Write integrity assurance circuitry 30 may ensure write device failure detection within a guaranteed maximum time. Write integrity assurance circuitry 30 may ensure successful data write operations within a guaranteed maximum time and data write integrity, regardless of any potential write mechanism failures.

Write integrity assurance circuitry 30 may perform data write validation operations concurrently with normal write operations, independently of and in parallel with write operations, which may be referred to herein as interleaving data write validation operations with normal write operations, in various examples. Write integrity assurance circuitry 30 may further perform time-optimizing of write operation commands in accordance with performance criteria indicated or selected by host 44 in its interleaving of data write validation operations with normal write operations, in various examples. Write integrity assurance circuitry 30 may ensure time-optimizing in accordance with host-indicated performance criteria using the unique awareness of control circuitry 22 to schedule time-optimal input/output (I/O) operations via an algorithmic command scheduler, which may be flexibly tuned to optimize among various host-indicated performance criteria, such as data integrity risk versus power, performance, and latency, for example.

Write integrity assurance circuitry 30 may perform periodic validation of the write mechanism as an additional goal and constraint of time-optimizing algorithmic command scheduling, with an additional criterion of fulfilling a maximum time-delay requirement. Write integrity assurance circuitry 30 implementing such a maximum time-delay criterion in some examples may fulfill a guaranteed upper bound on aging in carrying out the write operation. Write integrity assurance circuitry 30 implementing a maximum upper bound on write aging in carrying out write operations in some examples may include adding an internal validation after every occurrence of a selected number of write operations or a selected length of time, with a maximum allowed age of write operations. That is, write integrity assurance circuitry 30 operates with assurance that it carries out every write operation within a selected maximum time. Write integrity assurance circuitry 30 may operate to provide assurance that it has confirmed that data has been written nominally within at most a selected range of time, and within a window of detection that is small enough that it can cover any delay internally to disk drive 15.

In order to assure that ordinary read/write operation excursions, drifts, and random noise won't cause false alarms, write integrity assurance circuitry 30 may implement an algorithm augmented with a recursive excursion and drift detection algorithm. An example recursive excursion and drift detection algorithm may track one or more of the density and severity of error events, and filter or differentiate between intermittent or random noise events, and systematic state changes which indicate component failure. This may enable write integrity assurance circuitry 30 to implement a stateful alert system. Write integrity assurance circuitry 30 may share this stateful alert system with host 44. Write integrity assurance circuitry 30 may provide host 44 with options to tune criteria and parameters of the stateful alert system, in accordance with the selected deployment policies and performance criteria of host 44. For example, write integrity assurance circuitry 30 may offer host 44 one selectable option indicating extremely mission critical applications, in which write integrity assurance circuitry 30 may output to host 44 an alert that informs host 44 about any possible indication of failure.

Write integrity assurance circuitry 30 may be configured to detect write mechanism failures in any type of energy-assisted recording, such as in HAMR, or in microwave-assisted magnetic recording (MAMR) (e.g., detecting write failures via ECS 334), in various examples. Write integrity assurance circuitry 30 may be configured to detect write mechanism failures that are either short-term, such as due to laser mode hops in examples of HAMR, or long-term, such as due to chemical corrosion, chemical smear buildup, or other chemical impacts; scratches; or permanent failure of the laser diode, for example. Laser mode hops are sudden changes in the dominant emission mode of a laser diode that are inherent to the physics of the laser diodes and that typically induce a sudden change in laser amplitude. The sudden change is typically of about five to ten percent of the laser amplitude, and is usually a reduction in laser amplitude, though sometimes also an increase.

Write integrity assurance circuitry 30 may be configured to respond differently to short-term and long-term write mechanism failures. For example, write integrity assurance circuitry 30 may respond to a short-term write mechanism failure by controlling the same head to perform another write operation on the same disk surface to write the data that failed to write due to the short-term write mechanism failure. Correspondingly, write integrity assurance circuitry 30 may respond to a long-term write mechanism failure by selecting a different head to perform another write operation on that head's corresponding disk surface to write the data that failed to write due to the long-term write mechanism failure, and/or write the data to an alternative storage medium, such as NAND flash memory or a media cache, for example. An illustrative operating context of write integrity assurance circuitry 30 monitoring and controlling a head 18 writing to a corresponding disk surface 17 in an HAMR disk drive is shown in FIG. 3 and described as follows with reference thereto.

Figure 3:
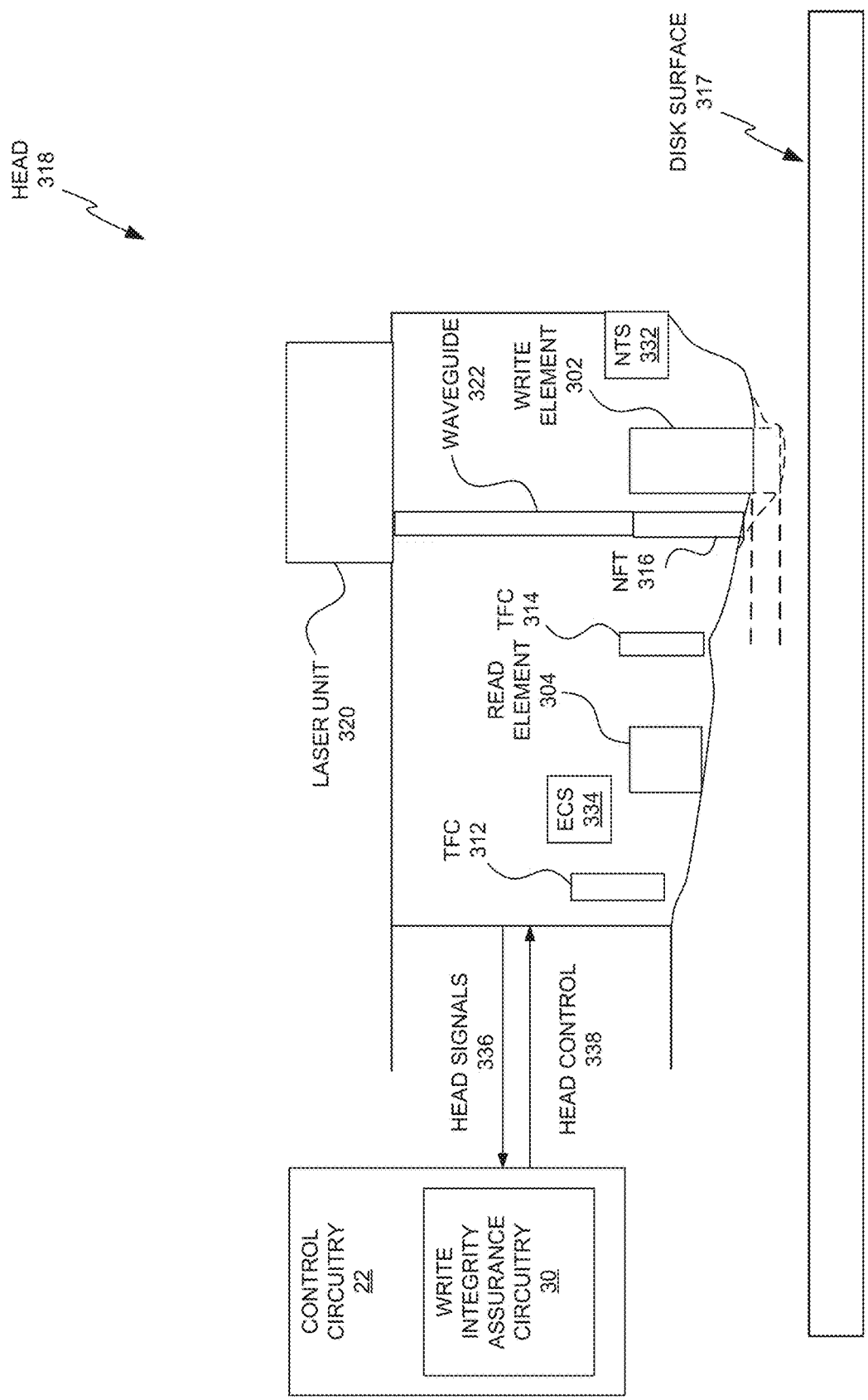
FIG. 3 depicts a conceptual side view diagram of a head of a disk drive, suspended above and operating proximate to a corresponding disk surface, and demonstrating changes in protrusion and aerodynamic profile causing changes in fly height due to changes in temperature, in accordance with aspects of this disclosure.

FIG. 3 depicts a conceptual side view diagram of a head 318 of a disk drive, suspended above and operating proximate to a corresponding disk surface 317, and demonstrating changes in protrusion and aerodynamic profile causing changes in fly height due to changes in temperature, in accordance with aspects of this disclosure. FIG. 3 further depicts operation of write integrity assurance circuitry 30 of control circuitry 22 in monitoring and controlling head 318. Head 318 and corresponding disk surface 317 may be an example of one of heads 18 and corresponding disk surfaces 17 as shown in FIGS. 2A and 2B. FIG. 3 is a conceptual diagram and not an engineering schematic, and the elements depicted may be disposed in any of a variety of arrangements in different examples.

Control circuitry 22 outputs head control signals 338 to head 318, and receives head signals 336 (including control signals and data) from head 318. Head 318 includes a write element 302, a read element 304, thermal fly height (TFC) control elements 312 and 314, and a laser unit 320 configured for emitting a laser via waveguide 322 and near-field transducer (NFT) 316. NFT 316 induces a plasmon that heats a track on disk surface 317 that passes proximate to write element 302, enabling heat-assisted magnetic recording.

Head 318 further includes near-field transducer thermal sensor (NTS) 332, which measures temperature proximate to NFT 316 and write element 302, and embedded contact sensor (ECS) 334, which measures temperature proximate to read element 304. Since laser heating is localized proximate to NFT 316 and write element 302, including sudden changes in laser heating due to laser mode hops, NTS 332 is well-suited for measuring changes in temperature due to laser heating and laser mode hops, while ECS 334 is positioned farther away from the path of the laser and is relatively insulated from changes in temperature due to laser mode hops. Control circuitry 22 and write integrity assurance circuitry 30 may also measure a differential between NTS 332 and ECS 334, which may cancel out some noise in common to both NTS 332 and ECS 334. Control circuitry 22 and write integrity assurance circuitry 30 may thereby measure changes in temperature proximate to NTS 332 with higher signal-to-noise ratio (SNR) than is possible via the signal from NTS 332 alone. NTS 332 and ECS 334 measure, in part, the efficiency of the laser in heating the media interface of disk surface 317. Write integrity assurance circuitry 30 may thus use the signals from NTS 332 and ECS 334 as an indicator of the integrity of laser performance of laser unit 320 for performing write operations.

NFT 316 is an example implementation of an energy-bearing component of head 318 in an energy-assisted recording (EAR) system. NTS 332 and ECS 334 are example implementations of temperature sensors and of a temperature sensor system disposed on head 318, and NTS 332 is an example temperature sensor disposed proximate to an energy-bearing component of head 318. In other examples, head 318 may include any other kind of sensors disposed proximate to an energy-bearing component of head 318, and configured to sense any type of energy or any type of condition of head 318.

Control circuitry 22 writes data to disk surface 317 by modulating a write current in an inductive write coil in write element 302, to record magnetic transitions onto corresponding disk surface 317 in a process referred to as saturation recording. During readback, read element 304 (e.g., a magneto-resistive element) in head 318 senses the magnetic transitions, and a read channel demodulates the resulting read signal. Heat-assisted magnetic recording (HAMR) enables high-quality written data at high densities enabled by a high-coercivity medium, by heating the disk surface 317 during write operations in order to decrease the coercivity of the magnetic medium, thereby enabling the magnetic field generated by the write coil to magnetize the temporarily heated area of disk surface 317. The disk surface encoding the data thus written then cools back down and thereby returns to heightened magnetic coercivity which preserves the durability of the written data at higher density than is possible in conventional techniques such as perpendicular magnetic recording (PMR).

Any suitable technique may be employed to heat the surface of the disk in HAMR recording, such as with a laser diode in laser unit 320 and NFT 316 disposed proximate to other write components of head 318. Since the quality of the write/read signal depends on the fly height of head 318, head 318 may also comprise one or more fly height actuators (FHA) for controlling or influencing the fly height. Any type of fly height actuator may be employed, such as TFCs 312, 314 as in the example of FIG. 3, which control or influence fly height of head 318 above disk surface 317 through thermal expansion, or a piezoelectric (PZT) actuator (not included in the example of FIG. 3) that actuates through mechanical deflection, or other FHA embodiments, in other examples.

When control circuitry 22 applies current (or equivalently, power in any form) to laser unit 320 during write operations, laser unit 320 may exhibit sudden changes between two or more available modes of laser emission. Such sudden changes in laser emission modes may cause transients, or sudden shifts in magnitude, in output power or amplitude of the laser being emitted by laser unit 320. This phenomenon is known as laser mode hopping. Because such laser mode hopping can create sudden, sometimes unpredictable changes in the laser amplitude that heats an area of disk surface 317 to be written to via write element 302, laser mode hopping may also cause sudden, unpredictable write width changes, even while the write current applied to write element 302 remains constant. That is, a greater or lesser track width across disk surface 317 may be susceptible to being written to, by the constant write current, in response to the laser suddenly becoming more or less powerful, respectively. The laser amplitude or voltage in terms of the amplitude or voltage of the laser that is emitted may thus differ significantly from that expected from the laser current (which may be parameterized as power or as current or otherwise) that control circuitry 22 applies to laser unit 320.

Laser mode hops can also cause sudden changes in thermal expansion effects and thermal protrusion in the area of head 318 proximate to NFT 316 and write element 302 (illustratively depicted in dashed lines), which may also have changing effects on the aerodynamics of head 318, which in turn may also have changing effects on fly height and write strength. In some examples, unmitigated laser mode hops have been observed to induce sudden changes in fly height and are at least a major contributor to total fly height variation in HAMR disk drives. Unmitigated laser mode hop effects on write strength and on other involved performance characteristics such as fly height have posed a substantial challenge in advancing the performance of HAMR drives.

Inventive aspects of this disclosure include write integrity assurance circuitry 30 closely monitoring the operating conditions of head 318, including by monitoring the signals from NTS 332 and ECS 334, and by subtracting the signal from ECS 334 from the signal from NTS 332 to monitor the NTS-ECS differential signal, in various examples. NTS 332 and ECS 334 may be configured to detect and output signals on rapid, fine-grained time scales comparable to the time scales of data write operations via write element 302 and laser unit 320, e.g., on the scale of individual microseconds or smaller increments of time, in various examples. By monitoring the signals from NTS 332 and ECS 334 and the NTS-ECS differential signal, write integrity assurance circuitry 30 may thus closely monitor the applicable conditions of the write operations in real-time, also on the order of individual microseconds or smaller increments of time, in various examples. This rapid, fine-grained, real-time monitoring of the operating conditions of the write operations via head 318 provide write integrity assurance circuitry 30 with substantial capabilities to make ongoing real-time assessments and determinations of whether the write mechanisms of head 318 are operating nominally. Such real-time monitoring and analysis of the operating conditions of head 318 by write integrity assurance circuitry 30 thus substantially support write integrity assurance circuitry 30 in being enabled to determine and output any failure of the write mechanism or of a write operation within a guaranteed bounded and short maximum span of time, in various examples.

Thus, as part of implementing write failure protection, write integrity assurance circuitry 30 may monitor signals from NTS 332 and/or ECS 334, and other signals and inputs, in various examples, which can provide realtime monitoring and measurement of the energy-assisted write process in HAMR. Using the monitoring results of NTS 332, ECS 334, and/or other inputs, in various examples, write integrity assurance circuitry 30 may determine and ensure outputting a rapid alert to host 44, within at most a guaranteed worst-case delay between occurrence of a degraded write and the outputting of the alert to host 44 that the write process for indicated affected data is compromised. Write integrity assurance circuitry 30 may thus provide real-time detection capability of write element failure, or at least rapid, guaranteed bounded-time capability of detecting write element failure and outputting an alert of that failure, in various examples.

Write integrity assurance circuitry 30 may be further configured to limit the risks of outputting alerts for false positives of data write failure, and of optimizing a balance between the risks of outputting false positives with the risks of failing to output alerts for true positives, in various examples. In order to limit the false positive risk, write integrity assurance circuitry 30 may be further configured to implement a stateful behavior. By default, write integrity assurance circuitry 30 may be in a "no risk" mode. In this state, host 44 can assume minimal risk of failed writes when control circuitry 22 is outputting a positive status indication, similar to non-EAR devices.

Write integrity assurance circuitry 30 may be further configured to respond to detecting a clear indication of write failure by selecting, generating, and outputting an alert state, which indicates to host 44 that a set of one or more given write operations may be at risk. Write integrity assurance circuitry 30 may be further configured to ensure outputting the alert state with at most a maximum delay between those writes subject to the detected write failure and the outputting of the alert state. Write integrity assurance circuitry 30 may have previously offered host 44 options to preconfigure whether or not write integrity assurance circuitry 30 would automatically respond to an alert by performing a verification of whether or not the data subject to the detected write failure, and any writes since this state change, were in fact written, and with nominal write strength. Write integrity assurance circuitry 30 may further be configured to comprise or to access a write location tracking buffer configured to track a selected number of the last write locations.

Write integrity assurance circuitry 30 may further be configured to be able to select, generate, and output a compromised write element state, in response to detecting a compromised write element. Write integrity assurance circuitry 30 may further be configured such that outputting the compromised write element state triggers an immediate data risk alert. Write integrity assurance circuitry 30 may be configured such that this compromised write element state is triggered by failure of any data write verification event, and/or by sufficiently significant excursions of the signal from NTS 332 from nominal. Write integrity assurance circuitry 30 may be configured to pursue a policy of limiting a number of writes to trigger the alert state to a number of write data which it can buffer to provide 100% assured data protection. Analogous to the case of write cache enabled, write integrity assurance circuitry 30 may offer user-selectable and user-configurable options for specifying the parameters for the states, alerts, and data protection assurance as described above.

Write integrity assurance circuitry 30 may thus both monitor operating conditions at the write mechanisms of head 318 for potential write failure events in real-time, while configuring a command scheduler to interleave data write verification operations concurrently among normal write operations in a user-configurable time-optimized way, verifying that data was written successfully, within a defined maximum wait time or set time limit. Write integrity assurance circuitry 30 may also guarantee notification of any write failure within the defined set time limit. With systems and methods such as these, write integrity assurance circuitry 30 may ensure data integrity, in effectively a service level agreement (SLA) paradigm in HAMR. Write integrity assurance circuitry 30 may guarantee HAMR data integrity in a way that enables disk drive 15 and host 44 to have system architecture designed around that data integrity guarantee. For example, the system architecture can be designed without requiring other backup or redundancy features to address cases of not discovering data write failures for uncertain or unbounded notification times typical of passive monitoring.

Write integrity assurance circuitry 30 may provide user-configurable or user-tunable options for the maximum data write verification wait time to be configured as a system design parameter based on user-selectable performance criteria, such as to optimize for or among one or more of minimum power consumption, maximum input/output operations per second (IOPS) performance, minimum latency, and/or other performance criteria. For example, write integrity assurance circuitry 30 may enable a maximum write verification performance with a fastest possible write verification assurance time, for mission-critical applications. If write integrity assurance circuitry 30 receives a selection of this maximum write verification performance from host 44 or from a user, write integrity assurance circuitry 30 may tune its operating parameters to perform verification that data has been written as expected as rapidly as possible, and with a shortest possible guaranteed verification wait time. As another example, write integrity assurance circuitry 30 may enable a maximum data integrity assurance setting, which may trigger a rapid, redundant backup and write verification if write integrity assurance circuitry 30 detects even a marginal off-nominal effect in a write operation or a low chance thereof. As with any optimization among multiple performance criteria, tuning performance to provide assurance of a shortest possible guaranteed verification wait time and/or maximum data integrity assurance may involve some degree of trading off against other performance goals, such as latency.

Write integrity assurance circuitry 30 may also offer user-selectable performance either for all operations or specific to certain sets of data or certain kinds of data. For example, write integrity assurance circuitry 30 may offer to host 44 an option for a balanced configuration in which write integrity assurance circuitry 30 tunes the operating parameters of disk drive 15 to provide strong, balanced performance with both a relatively short guaranteed verification wait time and relatively low latency, in context of disk drive 15, while also offering to host 44 another option to designate certain sets of data for special treatment with a different performance configuration, such as a maximum data integrity assurance setting, as described above. Write integrity assurance circuitry 30 may also offer host 44 settings for guaranteed verification wait time such as a shortest possible guaranteed verification wait time. Write integrity assurance circuitry 30 may receive a general selection of the balanced configuration from host 44, and may in general operate with parameters tuned to perform in accordance with the balanced configuration. Write integrity assurance circuitry 30 may then receive a new block of data from host 44 along with an indicator that the shortest possible guaranteed verification wait time configuration is selected for this new block of data. Write integrity assurance circuitry 30 may then shift its operating parameters to write this new block of data and perform verification that the data from the new block has been written as expected with the shortest possible guaranteed verification wait time and/or with maximum data integrity assurance setting. Write integrity assurance circuitry 30 may output to host 44 confirmation of the verification of the successful write of the data, regardless of its internal guaranteed verification wait time or amount of buffering for each string of data, in various examples. Write integrity assurance circuitry 30 thus enables host 44 to rely on selectable and configurable guaranteed verification wait times and data integrity assurance settings, and effectively functions with an SLA on guaranteed verification wait times, in various examples.

Write integrity assurance circuitry 30 may comprise or use any kind of buffer as a write integrity assurance buffer in which to store newly incoming data while it performs write operations for the incoming data and waits to verify the write operations, and to rewrite if necessary. Write integrity assurance circuitry 30 may comprise or use a write integrity assurance buffer that is at least large enough to store the maximum amount of data that control circuitry 22 would write within the longest possible guaranteed verification wait time that write integrity assurance circuitry 30 offers. Write integrity assurance circuitry 30 may comprise or use NAND flash memory, a media cache, one or more other volatile memory components, one or more other non-volatile memory components, one or more tracks of disk surface 317, or any combination of these or other components, to implement the write integrity assurance buffer.

If write integrity assurance circuitry 30 gets a negative result from a write verification, indicating that a set of data did not write nominally, write integrity assurance circuitry 30 may respond with any kind of failover option for rewriting that set of data from the write integrity assurance buffer. If the negative result from a write verification includes indications that the off-nominal write operation was due to a temporary effect, such as a laser mode hop, write integrity assurance circuitry 30 may, in response, send the affected set of data from the write integrity assurance buffer back to the same head 318 to attempt to write again. If the negative result from a write verification includes indications that the off-nominal write operation was due to a long-term effect, such as a smear build-up or a laser diode malfunction, write integrity assurance circuitry 30 may, in response, send the affected set of data from the write integrity assurance buffer back to a different head of disk drive 15 to write to its corresponding disk surface. Write integrity assurance circuitry 30 may also send the affected set of data from the write integrity assurance buffer to an alternative medium, such as NAND flash memory or a media cache, in various examples. In any case, write integrity assurance circuitry 30 may perform another verification attempt and receive confirmation that the new write attempt was successful. Write integrity assurance circuitry 30 may, in response, output a confirmation of successfully verified write of that set of data to host 44 within the SLA guaranteed verification time limit.

Write integrity assurance circuitry 30 may also re-tune or reconfigure the operating parameters based on lifetime health monitoring and risk assessment. For example, write integrity assurance circuitry 30 may detect a minor but off-nominal chemical smear on one head. Write integrity assurance circuitry 30 may detect that the affected head is still writing nominally but that the smear on the affected head is also slowly accumulating over time, such that the smear poses an elevated risk of write failure in the foreseeable future. As another example, write integrity assurance circuitry 30 may detect that disk drive 15 is being operated at persistently elevated ambient temperature, which also poses an elevated risk of write failure across all heads in the foreseeable future. In both of these examples, write integrity assurance circuitry 30 may, in response to detecting a condition of elevated risk, re-tune one or more parameters for write verification upward, such as decreasing the time after each write before performing write verification, for the affected head or for all heads, respectively. As yet another example, if write integrity assurance circuitry 30 detects a write failure by a head in general, write integrity assurance circuitry 30 may, in response to detecting the write failure, tune one or more operating parameters upward for performing more or faster write verification for that head, in various examples. Thus, write integrity assurance circuitry 30 optimizes parameters such as the guaranteed write verification time with responsiveness to risk-relevant operating conditions. On the other hand, for a head or a disk drive that has maintained a history of nominal performance, write integrity assurance circuitry 30 may regard the head or the disk drive as being in a state of very low risk, and may maintain an original baseline level of write verification operating parameters. Write integrity assurance circuitry 30 may also comprise self-monitoring circuitry and may continue to collect and add data to a training process for reinforcement learning (RL) or other machine learning (ML) techniques, and thereby continue to improve and further optimize its write operations over its lifetime. Write integrity assurance circuitry 30 may also have its optimization settings updated with results of RL or other ML training on larger sets of data from other disk drives, in various examples.

Figure 4:
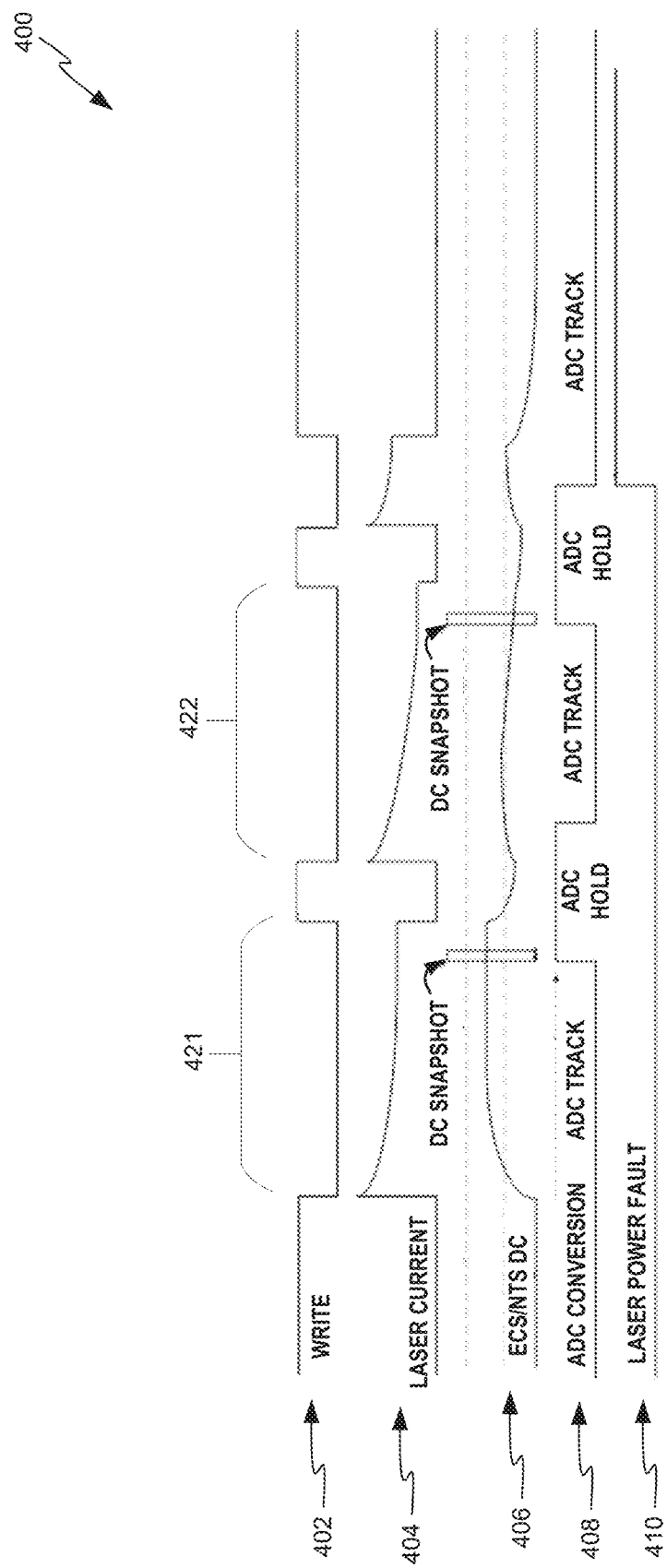
FIG. 4 depicts a graph of various control signals and condition determination signals generated by write integrity assurance circuitry and control circuitry in both a normal write and a detected write failure, in accordance with aspects of this disclosure.

FIG. 4 depicts a graph 400 of various control signals and condition determination signals generated by write integrity assurance circuitry 30 and control circuitry 22 in both a normal write and a detected write failure, in accordance with aspects of this disclosure. Graph 400 shows write signal 402, laser current 404, NTS-ECS differential signal 406, NTS-ECS differential analog-to-digital (ADC) converter signal 408, and laser power fault status signal 410. Graph 400 shows these signals with respect to time, or equivalently, with respect to track position of a track, along the x-axis. Track position is nominally equivalent to time since control circuitry 22 controls the rotation rate of disks 16 with high precision.

Write signal 402 is depicted as down during writing data to sectors (also referred to as sector IDs or SIDs), and as up when not writing data to sectors. In particular, write signal 402 is depicted as down during attempted data write operations to sectors 421 and 422 and an initial portion of 423, before write integrity assurance circuitry 30 interrupts the write operation in response to detecting a fault in the write operation in sector 422. Write signal 402 is depicted not writing data to sectors before writing has begun, during servo read intervals between sectors, and then after write integrity assurance circuitry 30 has controlled a stop to writing in response to detecting a fault in the write operation.

Laser current 404 is depicted operating nominally during sector 421 under control of control circuitry 22 initiating the laser current at the start of the write operation for sector 421, and controlling the laser current to decrease asymptotically over the course of sector 421. The specific form of this nominal curve of laser current may be to ramp up the laser quickly toward its steady state operating conditions (such as temperature), and then to back down e.g. asymptotically to compensate for the laser having settled into its steady state for the remainder of the sector.

NTS-ECS differential signal 406 reflects the nominal results of this laser behavior, with an exponential or super-exponential initial increase in the early portion of sector 421, indicating a corresponding nominal increase in temperature of the portion of head 318 proximate to write element 302 and NTS 332, followed quickly by settling into a steady state for the rest of sector 421. Write integrity assurance circuitry 30 may receive and observe NTS-ECS differential signal 406 and confirm and verify from this signal that NTS-ECS differential signal 406 indicates nominal laser behavior and nominal write performance.

In some examples, write integrity assurance circuitry 30 may assess NTS-ECS differential signal 406 continuously for verification of nominal properties over time. In some examples, write integrity assurance circuitry 30 may read and assess NTS-ECS differential signal 406 in sector 421 in a discrete interval or snapshot 431. Snapshot 431 may coincide with the beginning of ADC conversion window 441, and may convey NTS-ECS differential signal 406 in a late sample toward the end of the write operation of sector 421. Snapshot 431 may provide a reliable indication of the state of laser behavior during the write operation of sector 421 with a lower bandwidth requirement than for integrity assurance circuitry 30 to read and assess NTS-ECS differential signal 406 continuously, in some examples.

In all of these examples, write integrity assurance circuitry 30 is enabled to assess from NTS-ECS differential signal 406 that the laser behavior in the write operation of sector 421 is nominal, and to output a verification of nominal laser behavior and a nominal write operation. In some examples, write integrity assurance circuitry 30 may also perform further verification steps before outputting a verification of nominal write operation.

Extraordinarily, NTS 332 and ECS 334 are able to deliver their signals and write integrity assurance circuitry 30 is enabled to process and determine the NTS-ECS differential signal 406 and what it indicates about laser behavior in real-time, on the very short time scales of the write operation. In some examples, the write operation for an individual sector has a time interval in the low tens of microseconds. In two illustrative examples, the write operation for an individual sector may have a time interval of approximately 20 microseconds, or of approximately 14.4 microseconds, respectively. Write integrity assurance circuitry 30 determining the NTS-ECS differential signal 406 and outputting a positive verification or negative indication of the nominal health of the write operation for the sector also on the scale of microseconds in real-time provides substantial support for write integrity assurance circuitry 30 being enabled to provide rapid write verification within a guaranteed time limit.

In contrast to the nominal write in sector 421, sector 422 depicts write integrity assurance circuitry 30 detecting, via NTS-ECS differential signal 406, off-nominal laser power indicative of a failed write operation. Write integrity assurance circuitry 30 may then output an indication of a failed write operation, and take further actions, such as send the data subject of that failed write operation for another attempted write operation, such as to a different head, in response to detecting that event, in various examples. In sector 422, laser current 404 is depicted only reaching a lower initial value than in sector 421, and descending at a higher rate, to finish at a substantially lower final value.

Off-nominal laser current is one example of a root cause of an off-nominal attempted write operation. NTS-ECS differential signal 406 accurately tracks the results of this off-nominal laser current over the course of sector 422, rising only slightly at the beginning of sector 422, then spending much of sector 422 descending, and even, by the end of sector 422, falling below its value during the prior servo read interval between sectors 421 and 422, and falling below its lasing threshold current, indicative of ceasing to emit a laser. This is accurately indicative of the laser failing to operate nominally, and inducing a failure of the attempted write operation in sector 422. Write integrity assurance circuitry 30 accurately and rapidly detects this below-nominal NTS-ECS differential signal 406, and may rapidly respond by outputting an indication of the failure of the write operation, and by sending the data from that write operation to a different head for writing elsewhere. This capability of write integrity assurance circuitry 30 to detect and respond to this write failure rapidly in realtime by writing that data elsewhere in a rapid second write operation provides substantial support for write integrity assurance circuitry 30 being able to adhere to an SLA-type of guaranteed verification of successful data write operation within at most a specified maximum time limit.

Figure 5:
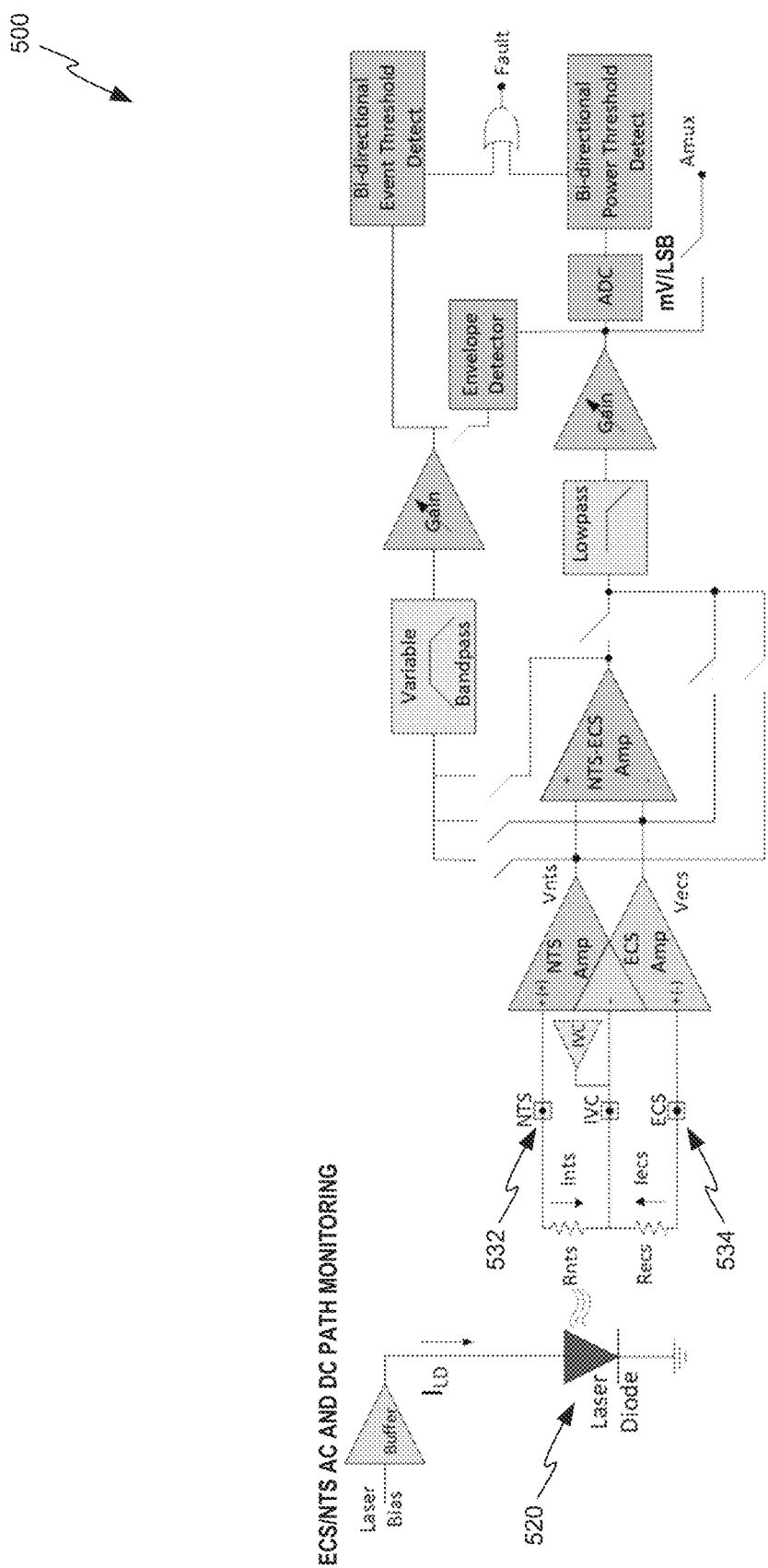
FIG. 5 depicts a circuit diagram of an example NTS-ECS monitoring system comprising a near-field transducer thermal sensor (NTS), which measures temperature proximate to a near-field transducer (NFT) and a write element of a head, and an embedded contact sensor (ECS), in accordance with aspects of this disclosure.

FIG. 5 depicts a circuit diagram of an example NTS-ECS monitoring system 500 comprising an NTS 532 and an ECS 534, in accordance with aspects of this disclosure. NTS 532 and ECS 534 may be example implementations of NTS 332 and ECS 334, respectively, as depicted comprised in head 318 in FIG. 3. The remainder of NTS-ECS monitoring system 500 may be comprised in and as part of control circuitry 22. NTS-ECS monitoring system 500 comprises the components and configuration as depicted in FIG. 5, and provides an example implementation of an NTS-ECS monitoring system that is capable of detecting and outputting an NTS signal, an ECS signal, and an NTS-ECS differential signal. NTS-ECS monitoring system 500 provides accurate temperature readings, proximate to the emissions from laser diode 520 and plasma resulting therefrom, and on time scales on the order of microseconds and in real-time, in various examples. NTS 532 thereby supports the rapid, real-time functions of an NTS as described herein, and of helping enable write integrity assurance circuitry 30 also to perform its rapid, real-time functions as described herein. In other examples, any kind of thermistor, bolometer, or detecting device of any kind that measures laser current or laser amplitude or accurate indicators thereof may be used and may be configured to provide rapid laser performance sensing data to write integrity assurance circuitry 30.

Figure 6:
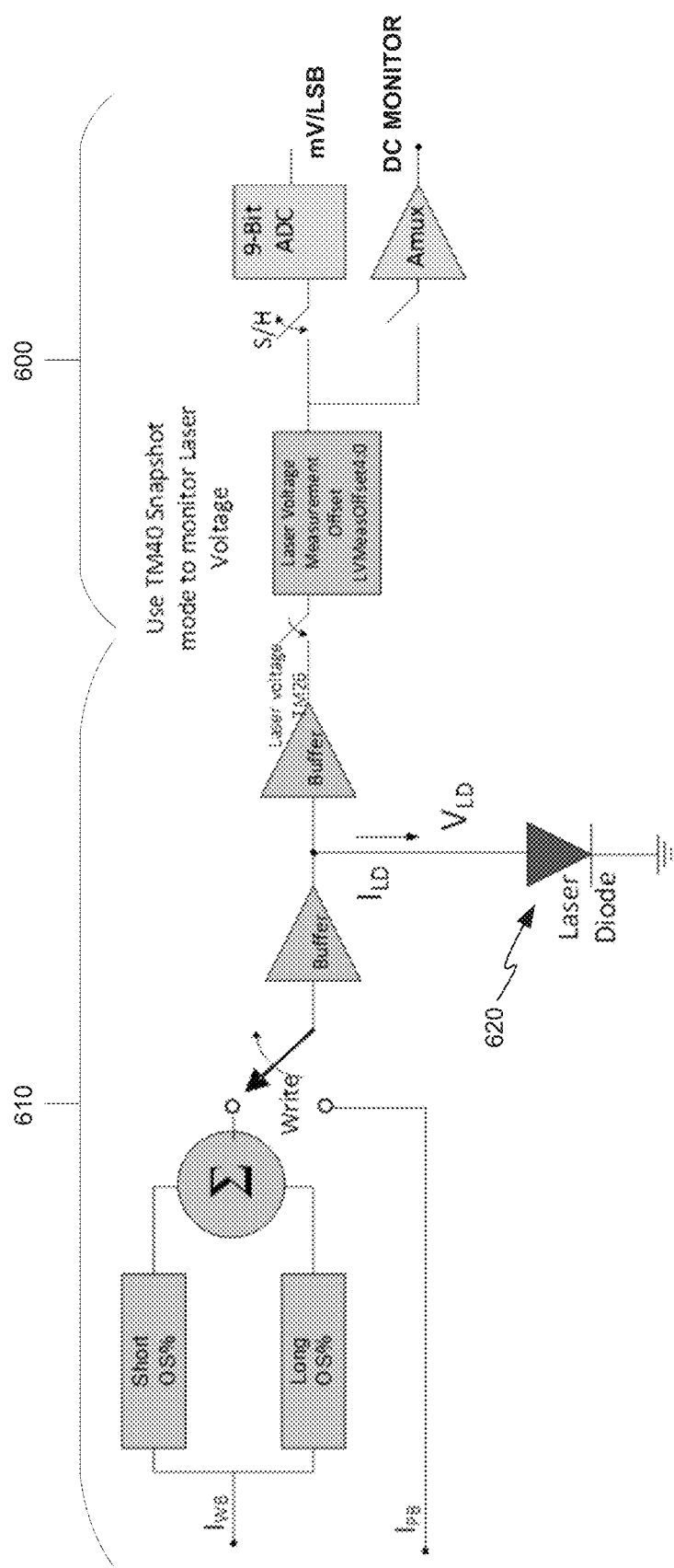
FIG. 6 depicts laser driver circuitry powering a laser diode of a head, and laser voltage monitoring and analog-to-digital conversion (ADC) circuitry, in accordance with aspects of this disclosure.

FIG. 6 depicts laser driver circuitry 610 powering a laser diode 620 of a head, and laser voltage monitoring and analog-to-digital conversion (ADC) circuitry 600, in accordance with aspects of this disclosure. Laser voltage monitoring and ADC circuitry 600 is an example implementation that may detect and measure laser voltage, convert the measure laser voltage signal to digital, and output the digital laser voltage signal, for further use by write integrity assurance circuitry 30. Laser voltage monitoring and ADC circuitry 600 is an example implementation that may output NTS-ECS differential analog-to-digital (ADC) converter signal 408, as depicted in FIG. 4 and described above. Laser voltage monitoring and ADC circuitry 600 may thus provide digital snapshots, as described above with reference to FIG. 4, of measured laser voltage, and thus of laser power as the product of the measured laser voltage and the known outputted laser current. As an example, laser mode hops may cause the voltage and power of the laser output to vary by typically five to ten percent (while having the same laser current applied). Write integrity assurance circuitry 30 may thus use the output of laser voltage monitoring and ADC circuitry 600 to monitor whether the laser output is nominal, as one element of rapidly monitoring for whether write operations can be verified as nominal, in various examples.

Figure 7:
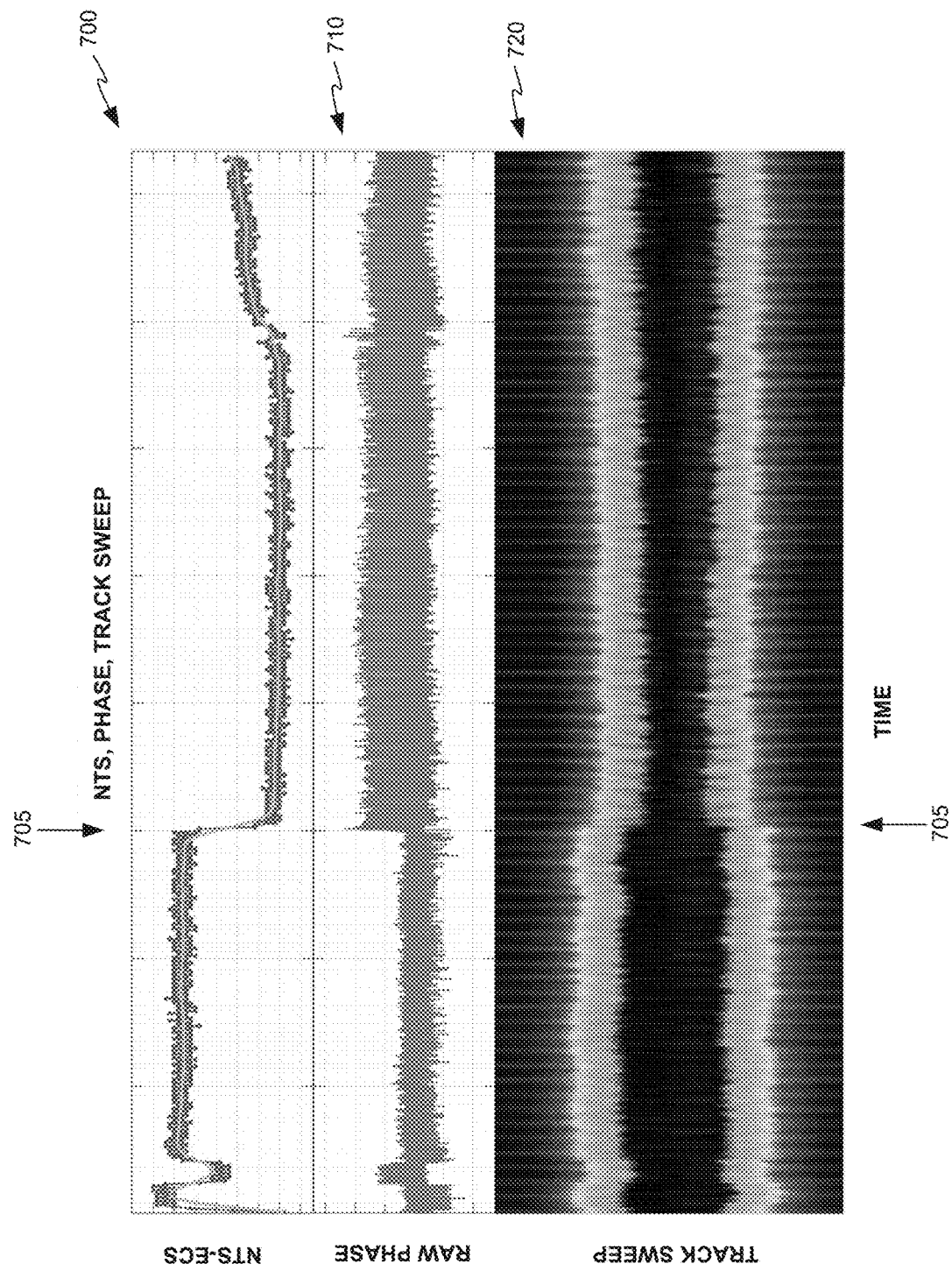
FIG. 7 depicts graphs of an NTS-ECS differential signal, a readback signal raw phase signal, and a data track width, with respect to time, before and after a laser mode hop, in accordance with aspects of the present disclosure.

FIG. 7 depicts graphs of NTS-ECS differential signal 700, readback signal raw phase signal 710, and data track width 720, all with respect to time, before and after a laser mode hop at time 705, in accordance with aspects of the present disclosure. NTS-ECS differential signal 700 may be processed by control circuitry 22 based on the NTS and ECS signals received from NTS 332 or 532 and ECS 334 or 534 as shown in FIGS. 3 and 5 and as described above.

As FIG. 7 depicts, at time 705, NTS-ECS differential signal 700 demonstrates a sudden, sharp decrease, indicative of a sudden drop in temperature induced by a laser mode hop decreasing the efficiency of laser emission. The decrease to below-nominal laser power causes a sudden off-nominal write strength at time 705, as shown in the sudden skew and increase in range of the readback signal raw phase 710 and the sudden decrease in data track width 720, showing an below-nominal data write strength and below-nominal track readback signal strength starting at time 705, due to the laser mode hop. Write integrity assurance circuitry 30 may receive NTS-ECS differential signal 700 and detect the sudden decrease in NTS-ECS differential signal 700 at time 705 and, in response to detecting the sudden decrease in NTS-ECS differential signal 700 at time 705, take action to write the data that was the subject of the attempted write operation during time 705 elsewhere, such as by sending the subject data to another head to write on another disk surface, in various examples.

In some examples, write integrity assurance circuitry 30 may detect an unexpected change in NTS-ECS differential signal 700 and, in response to detecting the unexpected change in NTS-ECS differential signal 700, modify the laser current to compensate for the unexpected change in laser power indicated by the unexpected change in NTS-ECS differential signal 700. For example, in response to detecting the unexpected decrease in NTS-ECS differential signal 700 at time 705, write integrity assurance circuitry 30 may rapidly raise the laser current a proportionate amount to rapidly return laser power to nominal in the post-hop laser mode. For example, if the unexpected decrease in NTS-ECS differential signal 700 at time 705 is indicative of a decrease in laser power of 10.0%, write integrity assurance circuitry 30 may rapidly increase laser current by approximately 11.1% to compensate and return the laser power to nominal. Write integrity assurance circuitry 30 may then rapidly verify via NTS-ECS differential signal 700 whether laser power has been returned to nominal in real-time, and rapidly return to nominally writing data. With rapid and real-time detecting capability via NTS-ECS differential signal 700 and rapid and real-time response capability, write integrity assurance circuitry 30 may be enabled to rapidly resolve some detected off-nominal write conditions, which may further support providing verification of successful write operations within a guaranteed time limit, in various examples.

Write integrity assurance circuitry 30 may also track and compensate for changing conditions over longer terms, in various examples. For example, write integrity assurance circuitry 30 may detect long-term drift in the laser emission onset threshold of a laser diode of a head, such as from 12 milliamps to 11 or 10 or 13 or 14 milliamps, and compensate by modifying the laser bias current applied to that head over time accordingly, to maintain a nominal laser power.

Figure 8:
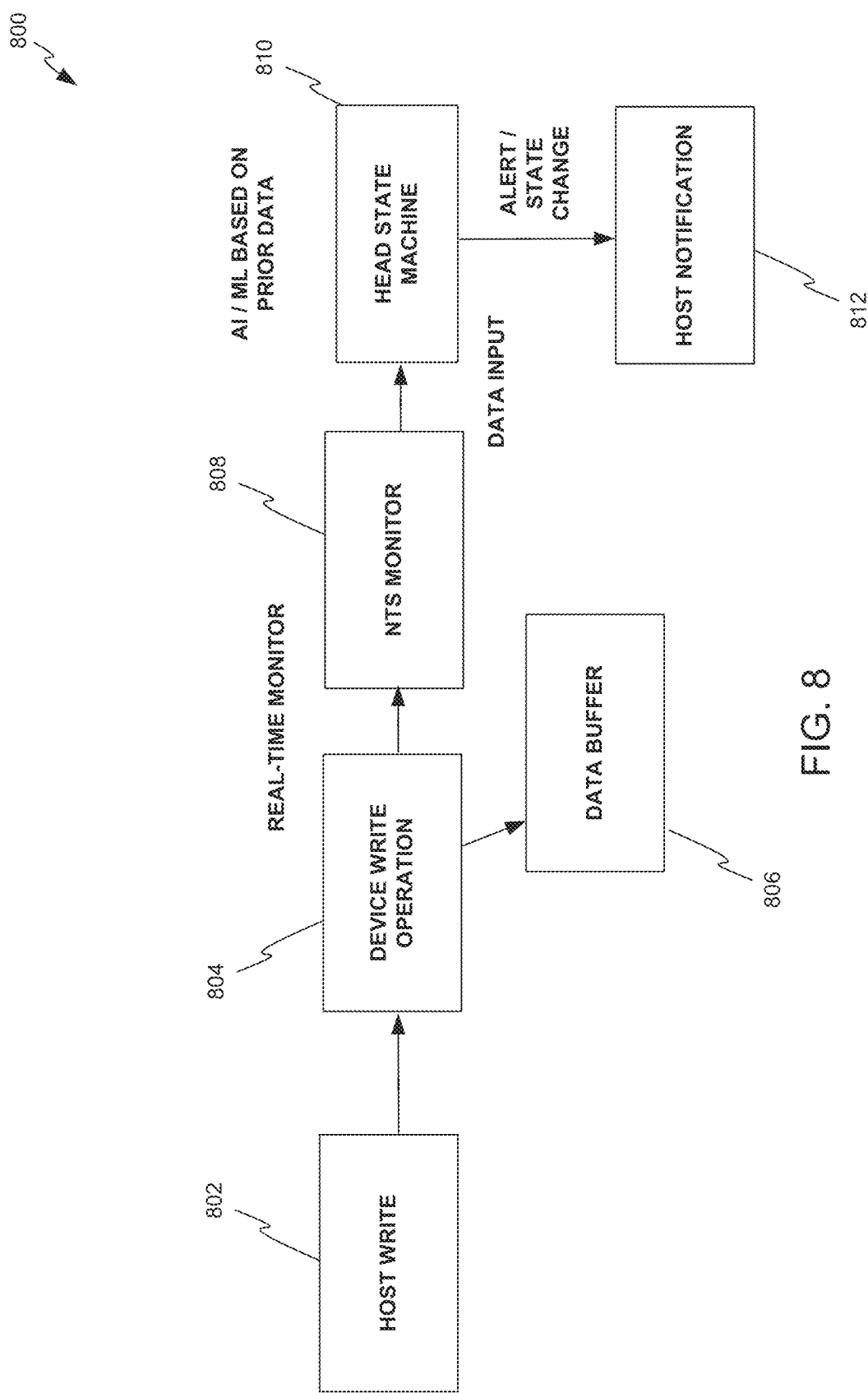
FIG. 8 depicts a flowchart for a method that control circuitry including write integrity assurance circuitry may perform for monitoring and modeling the state of a head and for notifying a host of changes in state of the head, in accordance with aspects of the present disclosure.

FIG. 8 depicts a flowchart 800 for a method that control circuitry 22 including write integrity assurance circuitry 30 may perform for monitoring and modeling the state of a head 18 and for notifying host 44 of changes in state of a head 18, in accordance with aspects of the present disclosure, and making reference again to elements as depicted in FIGS. 2A and 2B. Control circuitry 22 may receive a host write command with data to be written (802). Control circuitry 22 may send the data to one or more of heads 18 to write to disk surfaces 17 (804). Write integrity assurance circuitry 30 may temporarily buffer the data in a write integrity assurance data buffer (806) and monitor the write operation for the data via NTS-ECS differential signal (808), or via NTS signal or other signals indicative of the behavior of head 18, in various examples.

Write integrity assurance circuitry 30 may collect the signals indicative of the behavior of head 18 and use them to model the state of head 18 (810), such as by performing machine learning modeling using a machine learning model of head 18 trained on large amounts of prior data on the long-term behavior of a large number of identical heads. Besides outputting notifications to host 44 of verification of successful write within a guaranteed time limit, write integrity assurance circuitry 30 may also output notifications to host 44 of updates on the states of the heads (812). Such updated head state information may include an alert that a head has failed, or updated information on head properties that affect future performance such as laser mode hop behavior or a chemical smear accumulation or updated predictive machine learning modeling of the heads with updated predictions of future expected lifetime or a future risk profile of potential off-nominal write operations, for example.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions, and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
one or more disks;
an actuator mechanism configured to position a selected head among one or more heads proximate to a corresponding disk surface among the one or more disks; and
one or more processing devices, individually or in combination, configured to:
receive, one or more signals indicative of conditions of a write operation performed by the selected head;
determine, based on the one or more signals, a verification status indicating whether the write operation was successful;
output the verification status within a selected time limit;
provide an option for selecting the selected time limit; and
set the selected time limit based on an input in response to the option for selecting the selected time limit.

2. The data storage device of claim 1, wherein the one or more processing devices, individually or in combination, are further configured to:
interleave data write validation operations with write operations, wherein determining the verification status is based on the data write validation operations; and
time-optimize the interleaving of the data write validation operations with the write operations based on the selected time limit.

3. The data storage device of claim 1, wherein the one or more processing devices, individually or in combination, are further configured to:
provide an option for applying different selected time limits for respective different sets of data,
wherein outputting the verification status within the selected time limit comprises outputting the verification statuses for the different sets of data within the different selected time limits for the respective different sets of data.

4. The data storage device of claim 1, wherein:
the write operation is a first write operation; and
the one or more processing devices, individually or in combination, are further configured to, in response to detecting that the write operation is not nominal, perform a second attempt of the write operation within the selected time limit, and under different conditions than the first write operation.

5. The data storage device of claim 4, wherein:
the one or more heads comprise a plurality of heads; and
the one or more processing devices, individually or in combination, are further configured such that performing the second attempt of the write operation under the different conditions comprises performing the second attempt of the write operation with a second head of the plurality of heads.

6. The data storage device of claim 4, wherein the one or more processing devices, individually or in combination, are further configured such that performing the second attempt of the write operation under the different conditions comprises performing the second attempt of the write operation with the selected head in response to detecting that a laser emitted by the selected head has returned to a nominal power.

7. The data storage device of claim 4, wherein the one or more processing devices, individually or in combination, are further configured such that performing the second attempt of the write operation under the different conditions comprises:
modifying current applied to a laser emitted by the selected head to compensate for a detected change in power of the laser, and
performing the second attempt of the write operation with the selected head with the modified current applied to the laser.

8. The data storage device of claim 1, wherein:
the one or more processing devices are coupled to a temperature sensor system configured to detect a temperature of a portion of the selected head; and
the one or more signals indicative of conditions of the write operation by the selected head that the one or more processing devices are configured to receive comprise signals from the temperature sensor system.

9. The data storage device of claim 8, wherein the temperature sensor system comprises one or more thermal sensors comprising a first thermal sensor in the selected head proximate to an energy-bearing component comprised in the selected head.

10. The data storage device of claim 9, wherein:
the one or more thermal sensors comprise a second thermal sensor in the selected head farther from the energy-bearing component than the first thermal sensor; and
the one or more processing devices, individually or in combination, are further configured to determine a differential signal based on a comparison between signals from the second thermal sensor and the first thermal sensor.

11. The data storage device of claim 1, wherein the one or more processing devices, individually or in combination, are further configured to:
detect a voltage drawn by a laser emitted by the selected head; and
modify a current applied to the laser to compensate for detected changes in the voltage.

12. The data storage device of claim 1, wherein the one or more processing devices, individually or in combination, are further configured to:
output information on a state of the selected head.

13. The data storage device of claim 12, wherein the information comprises information collected over time on the state of the selected head and predictive modeling of future performance of the selected head.

14. A method comprising:
receiving, by one or more processing devices individually or in combination, one or more signals indicative of conditions of a write operation performed by a selected head to a corresponding disk surface comprised in a data storage device;
determining, by the one or more processing devices individually or in combination, based on the one or more signals, a verification status indicating whether the write operation was successful;
outputting, by the one or more processing devices individually or in combination, the verification status within a selected time limit;

interleaving data write validation operations with write operations, wherein determining the verification status is based on the data write validation operations; and time-optimizing the interleaving of the data write validation operations with the write operations based on the selected time limit.

15. The method of claim 14, wherein the write operation is a first write operation, the method further comprising:

in response to detecting that the write operation is not nominal, performing a second attempt of the write operation within the selected time limit and under different conditions than the first write operation.

16. One or more processing devices comprising:

means for receiving one or more signals indicative of conditions of a write operation performed by a selected head to a corresponding disk surface comprised in a data storage device, wherein the write operation is a first write operation;

means for determining, based on the one or more signals, a verification status indicating whether the write operation was successful;

means for outputting the verification status within a selected time limit; and means for performing, in response to detecting that the write operation is not nominal, a second attempt of the write operation within the selected time limit, and under different conditions than the first write operation.

17. The one or more processing devices of claim 16, further comprising:

means for interleaving data write validation operations with write operations, wherein determining the verification status is based on the data write validation operations; and means for time-optimizing the interleaving of the data write validation operations with the write operations based on the selected time limit.

18. The data storage device of claim 1, wherein the one or more processing devices, individually or in combination, are configured to receive the one or more signals from one or more thermal sensors.

19. The method of claim 14, wherein the one or more processing devices, individually or in combination, receive the one or more signals from one or more thermal sensors.

20. The one or more processing devices of claim 16, wherein the means for receiving the one or more signals are configured to receive the one or more signals from one or more thermal sensors.

* * * * *